March 22, 1966     A. FISCHER     3,241,428
PLASTIC FASTENING DEVICE
Filed Feb. 21, 1962

INVENTOR.
ARTUR FISCHER
BY
Michael S. Striker

United States Patent Office 3,241,428
Patented Mar. 22, 1966

3,241,428
PLASTIC FASTENING DEVICE
Artur Fischer, Tumlingen, Kreis Freudenstadt, Germany
Filed Feb. 21, 1962, Ser. No. 175,877
1 Claim. (Cl. 85—83)

The present invention relates to fasteners.

More particularly, the present invention relates to fasteners for fastening together elements such as relatively thin plates and the like. Such fasteners extend, for example, through aligned openings of such a pair of plates or the like. It has been found in practice that a particular difficulty encountered with such fasteners resides in the prevention of the turning of the fastener with respect to the plates.

One of the objects of the present invention is to provide a fastener of the above type which on the one hand is capable of reliably fastening together a pair of elements such as relatively thin plates and which on the other hand is reliably prevented from turning with respect to the plates.

An additional object of the present invention is to provide a fastener of the above type which is particularly suited for fastening together plates of sheet metal.

Still another object of the present invention is to provide a fastener of the above type which fastens together a pair of thin plates or the like not only by pressure against the surfaces of aligned openings of the plates, which is to say a radial compression of the fastener against these surfaces, but also by pressing the plates against each other by exerting a force extending axially of the aligned openings of the plates.

With the above objects in view, the present invention includes an elongated elastomeric body made for example of nylon, polyvinyl chloride, polyethylene, and polypropylene which forms the fastener of the invention, this body being formed with an axial bore and with a transverse slit which extends axially along part of the body to provide the latter with a pair of parts separated from each other by the slit, these parts decreasing in cross section from one end of the body toward an opposite head end thereof, and in accordance with the invention this head end of the body is in the form of a thin annular wall provided with an exterior knurled surface.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Figure 1:
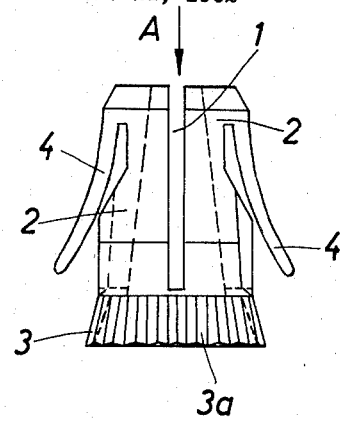
FIG. 1 shows in elevation a fastener constructed in accordance with the present invention.
Figure 2:
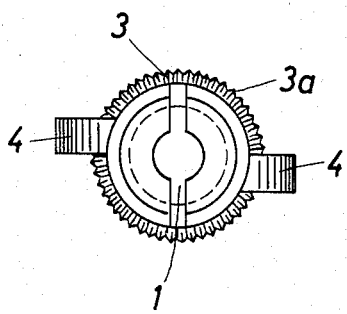
FIG. 2 is a top plan view of the fastener of FIG. 1 as seen in the direction of arrow A of FIG. 1.

Referring to FIGS. 1 and 2, the fasteners of the invention illustrated therein is made of any natural or synthetic elastomeric material which is yieldable, stretchable, and which is age-resistant. The elongated body, which forms the fastener of the invention, is formed with an axial bore passing all the way therethrough from one end to the other, and in addition the body is formed with a transverse, diametral slit 1 extending from the upper end of the body, as viewed in FIG. 1, axially therealong but terminating short of the head end of the body shown at the lower part of FIG. 1, so that the slit 1 extends along only part of the length of the body. This slit 1 divides the body into a pair of parts 2 which are separated by the slit, and, as is clearly apparent from FIGS. 1 and 2, each part 2 gradually decreases in cross section from the upper end of the body, as viewed in FIG. 1, toward the lower, head end thereof.

The head end of the body is in the form of a relatively thin, annular wall having a frustoconical configuration and provided with an exterior knurled surface 3a.

In addition, the fastener body is provided with a plurality of locking tongues 4 extending, as viewed in FIG. 1, from the upper end of the body toward the head end 3 thereof. These locking tongues 4 extend not only toward the head end 3 but also outwardly away from the remainder of the fastener body.

Figure 3:
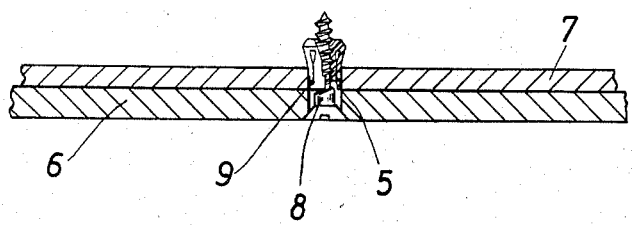
FIG. 3 is a partly sectional illustration of how the fastener of the invention fastens together a pair of thin plates.

Referring to FIG. 3, there is shown therein a pair of plates 6 and 7 which are to be fastened to each other, and these plates may be made of sheet metal, for example. The plates 6 and 7 are formed with aligned openings 5, respectively, at the place where they are to be fastened together, and these openings 5 are identical so that they form a continuation of each other. The fastener of the invention is radially compressed and introduced into the aligned openings 5. For example, the upper end of the body, as viewed in FIG. 1, is introduced upwardly through the opening 5 of the plate 6 of FIG. 3 and then through and beyond the opening 5 of plate 7 until the head end 3 is flush with the exterior surface of plate 6. Then a screw 8 is introduced into the axial bore of the fastener through the head end thereof and the screwing of the screw 8 into the fastener body compresses the material thereof tightly and radially against the inner surfaces of the aligned openings 5 so as to fasten the plates 6 and 7 to each other. Thus, the exterior surface 9 of the fastener body is locked tightly against the surfaces which define the openings 5. An additional locking action which prevents turning of the fastener body with respect to the plates 6 and 7 is provided by the knurled surface 3a of the head end 3, this knurled surface of course being also compressed against the opening 5 of at least one of the plates. Where these platse are made of sheet metal, this knurled surface 3a and the frustoconical configuration of the head end 3 are sufficient to prevent turning of the fastener with respect to the plates after the screw 8 is driven into the fastener body. However, in order, even in this case, to increase the pressure of the fastener body against the plates at parts of the fastener distant from the head end 3 thereof, the parts 2 have a cross section which increases in a direction away from the head end 3, as described above, so that even parts of the fastener which are relatively distant from the head end thereof are pressed against the plates with a force sufficient to prevent turning of the fastener with respect to the plates.

The compression of the locking tongues 4 at their free end portions between the fastener body and the plate 7 also contributes to the prevention of turning of the fastener with respect to the plates.

A particularly advantageous feature of the invention resides in the fact that the relatively great cross section of the parts 2 at their free end portions which extend beyond the plate 7, as shown in FIG. 3, results in spreading apart of these parts by the screw 8 to an extent which displaces the parts from each other by a distance greater than would be permitted by the diameter of the opening 5 so that the fastener spreads laterally beyond the opening 5 of the plate 7, as shown in FIG. 3. This action results not only in pressing the fastener against the edge of the opening 5 which is at the exterior surface of the plate 7, to prevent turning of the fastener in this way also, but in addition it causes the fastener to press the plates 6 and 7 against each other along the common axis of the openings 5, so that the fastener of the invention acts axially as well as radially to fasten together elements such as thin plates.

It will be understood that each of the elements described above, or two or more together, may also find a useful application in other types of fasteners differing from the types described above.

While the invention has been illustrated and described as embodied in elastic fasteners, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A fastener comprising an elongated elastomeric body formed with an axial frusto-conical bore and axially slit along part of its length with a slit extending transversely through said body and dividing the slotted portion thereof into a pair of parts which decrease in cross-section from one end of the body where the slit starts toward an opposite head end of said body, said head end being formed of a frusto-conical wall flaring outwardly from said elastomeric body, and having a thickness which is substantially less than the thickness of said parts, said frusto-conical wall flaring outwardly from said elastomeric body and provided with an exterior knurled surface, said frusto-conical wall formed also with an axial frusto-conical bore the angle of inclination of which, however, is greater than the angle of inclination of said axial frusto-conical bore in said elastomeric body, and said body having at least one exterior locking tongue attached to said elongated body in the region of said one end thereof and projecting substantially up to the region of said head end thereof.

References Cited by the Examiner

UNITED STATES PATENTS

| | | | |
|---|---|---|---|
| 1,229,528 | 6/1917 | Ruping | 85—83 |
| 2,255,650 | 9/1941 | Burke | 151—41.75 |
| 2,379,786 | 7/1945 | Bugg et al. | |
| 2,448,351 | 8/1948 | Brush. | |
| 3,027,670 | 4/1962 | Kramer et al. | 151—41.75 |
| 3,045,308 | 7/1962 | Tobey | 151—41.75 |

FOREIGN PATENTS

| | | |
|---|---|---|
| 1,234,665 | 5/1960 | France. |
| 1,240,813 | 8/1960 | France. |
| 603,984 | 6/1948 | Great Britain. |
| 530,042 | 7/1955 | Italy. |

EDWARD C. ALLEN, *Primary Examiner.*

CARL W. TOMLIN, *Examiner.*